United States Patent Office 3,344,119
Patented Sept. 26, 1967

3,344,119
PRODUCTION OF POLYOXYMETHYLENES
Otto Schweitzer, Konigstein, Taunus, and Wilhelm Querfurth, Oberursel, Taunus, Germany, assignors to Deutsche Gold- und Silber-Scheideanstalt vormals Roessler, Frankfurt am Main, Germany
No Drawing. Filed Apr. 5, 1965, Ser. No. 445,768
Claims priority, application Germany, July 23, 1960, D 33,842
4 Claims. (Cl. 260—67)

This application is a continuation-in-part of application Ser. No. 125,392, filed July 20, 1961, now abandoned.

The present invention relates to a process for the production of polyoxymethylenes having improved mechanical properties.

It is known that metallorganic compounds of phosphorus, arsenic and antimony can be used as catalysts for the polymerization of formaldehyde. It has furthermore been disclosed in U.S. Patent 2,828,286 that metallorganic compounds of type $R_3Me$ in which Me is an element with an atomic number from 15 to 51 can also be used as catalysts for such polymerization. In addition, British Patent 766,629 shows use of metal compounds of the formula $R_nMe$ as catalysts in which R signifies hydrogen, hydrocarbon, substituted hydrocarbons, hydroxy hydrocarbons, thio hydrocarbons or acid radicals and Me a metal, metal chloride or metal hydride. The use of oxides of the alkali and alkaline earth metals, as well as of aluminum, has also been proposed for the polymerization of monomeric formaldehyde.

U.S. Patent No. 2,985,623 discloses the production of polyoxymethylenes with redox catalysts in inert organic solvents and furthermore indicates that the polymerization may be initiated better in the presence of traces of heavy metal compounds, namely, compounds of copper, manganese or zinc.

According to the invention it was unexpectedly found that the mechanical properties of polyoxymethylenes produced with a redox system of tri-n-butyl amine and di-tertiary butyl peroxide could be improved considerably by carrying out the polymerization in the presence of soluble magnesium, calcium or strontium salts of organic acids, such as, the fatty acids, naphthenic acids and abietic acid, for instance, their caproates, caprylates, stearates, palmitates, naphthenates and abietates.

The process according to the invention can be carried out in an extraordinarily easy manner and it was completely unexpected that small quantities of the soluble metal salts employed according to the invention would effect the considerable improvement in the mechanical properties of the polyoxymethylenes produced therewith. It was found, for example, that the bending strength, bending angle on break, impact strength and notch toughness were considerably improved over those of the polymerization products obtained with the redox catalyst alone or the soluble metal salts alone. This property is not shared by the corresponding salts of metals such as copper, manganese, aluminum and zinc, the presence of which during polymerization causes a deterioration in the mechanical properties obtained with redox systems per se as catalyst. Also, for example, barium salts, while slightly improving the bending angle on break and providing improvements in impact resistance and notch bar impact resistance, effect a reduction in bending strength.

It was furthermore found that in some instances the thermal stability of the polyoxymethylenes was also improved. The process according to the invention renders it possible to produce polyoxymethylenes having mechanical properties which in part exceed those of the high grade synthetic resins, such as polymethyl methacrylate, polyamides and even in part those of polycarbonates.

The redox system composed of di-tertiary butyl peroxide and tri-n-butyl amine has proved particularly advantageous for the process according to the invention. The redox system is employed in conventional catalytic quantities. It is also possible to employ known co-catalysts for accelerating the polymerization, such as compounds containing a labile halogen atom, such as an ionogenically bound chlorine atom, or, also, to carry out the polymerization in the presence of known chain transfer agents. The preferred ratio of per compound to reducing component in the redox catalyst system is from 0.5 to 2.5 mols of per compound per mol of reducing component. The quantity of redox catalyst employed, for example, can range from 0.01 to 10%, preferably, 0.1 to 5%, calculated upon the solvent employed.

In the process according to the invention the polymerization of water free monomeric formaldehyde is carried out in an inert organic solvent containing the redox system catalyst and the soluble metal compound employed according to the invention. It is important for the process according to the invention that the metal salt employed is soluble in the reaction medium. As hydrocarbons and, especially, gasoline fractions having a boiling point range of 100–140° C. have proved particularly suited as the reaction medium for the process according to the invention, it is preferable to use metal salts whose acid component contains a relatively large hydrocarbon radical. Although only very small quantities of the metal salts are required, it is advisable to use salts of organic acids containing five or more carbon atoms.

Additions of 0.01 to 10 millimols of the metal salts employed according to the invention per liter of the reaction medium suffice for improvement of the mechanical properties of the polyoxymethylenes produced. These limits, however, can be exceeded at both ends if a smaller or larger effect is desired. It is advantageous, however, to employ about 0.05 millimol of the metal compound per liter of reaction medium.

The polymerization of the monomeric formaldehyde can be carried out at temperatures between −50 and +100° C., preferably, however, the polymerization according to the invention is carried out in the temperature range between +20 and +40° C. as this temperature range provides for the lowest technological cost.

In carrying out the process according to the invention, the redox system is suspended or dissolved in the inert organic solvent, preferably higher boiling hydrocarbon fractions, together with the soluble metal salt and monomeric formaldehyde introduced into such mixture, preferably at room temperature. The monomeric water-free formaldehyde employed in the process expediently can be produced by thermal decomposition of paraformaldhyde. Care must, however, be taken that moisture is excluded during the polymerization. Variations of the process can also be employed, such as, for example, by diluting the formaldehyde with an inert carrier gas or to employ sub- or superatmospheric pressures during the polymerization.

The polymers produced according to the invention are thermoplastic and can be processed in suitable apparatus such as injection molding machines. Stabilizing agents, age retarding agents, agents offering protection against light, lubricants, pigments, fillers and the like, can be incorporated in the polymers produced according to the invention before processing. It furthermore is possible to mix such thermoplastic polymers with other powdered synthetic resins such as phenol or urea formaldehyde resins. It furthermore is possible to process them together with monomeric or polymeric vinyl or alkyl compounds or with converted natural products such as gelatin, casein and the like.

In the following tests tabulated in the table below monomeric gaseous formaldehyde obtained by thermal decomposition of paraformaldehyde was dried and then passed into dry gasoline having a boiling point of 100–140° C. and containing the catalysts indicated in the table. The dry formaldehyde gas was introduced at room temperature but during the polymerization the temperature of the reaction medium rose to about 30–40° C. The polymerization proceeded without external cooling. The redox catalysts employed and the metal compounds employed, as well as their quantities, are given in the following table. The table furthermore contains the bending strengths measured with a dynstat apparatus and angle on break according to DIN 53 452, as well as the impact resistance and impact resistance (notch bar test) according to DIN 53 453 measured on the same apparatus. In the tests on the dynstat apparatus, so-called DIN-rod testing bodies (3 mm. thick plates) were used.

In the table:
$\sigma_b$ = bending strength (kg./cm.²)
$a_n$ = impact resistance (cm. kg./cm.²)
∢ = bending angle on break
$a_k$ = impact resistance notch bar test (cm. kg./cm.²)

We claim:
1. In a process for the polymerization of monomeric water free formaldehyde in an inert organic solvent in the presence of a redox system catalyst composed of di-tertiary butyl peroxide as oxidizing component and tri-n-butyl amine as reducing component to produce polyoxymethylenes, the step which comprises carrying out said polymerization in the presence of a salt of an organic acid containing at least 5 carbon atoms selected from the group consisting of fatty acids, naphthenic acids and abietic acid with a metal selected from the group consisting of magnesium, calcium and strontium dissolved in such inert organic solvent, the quantity of said salt being 0.01 to 10 millimol per liter of inert solvent used as the reaction medium and the quantity of redox catalyst system employed being 0.01 to 10% based on the solvent employed, the ratio of oxidizing component in said system being 0.5 to 2.5 mol per mol of reducing component.

2. The process of claim 1 in which said salt is calcium naphthenate.

3. The process of claim 1 in which said salt is magnesium naphthenate.

4. The process of claim 1 in which said salt is strontium naphthenate.

TABLE

| Test No. | Catalyst (millimol per liter solvent) | | | $\sigma_b$ | ∢ (deg.) | $a_n$ | $a_k$ |
|---|---|---|---|---|---|---|---|
| | Tri-n-butyl amine | Di-tertiary butyl peroxide | Metal salt as naphthenate (0.05 millimol) | | | | |
| 1 | 0.5 | 0.5 | | 1,340 | 79 | 35.8 | 11.9 |
| 2 | 0.5 | 0.5 | Al | 850 | 14 | 15.3 | 5.4 |
| 3 | 0.5 | 0.5 | Cu | 1,040 | 28 | 10.3 | 3.5 |
| 4 | 0.5 | 0.5 | Mn | 1,190 | 42 | 21.9 | 8. |
| 5 | 0.5 | 0.5 | Zn | 690 | 27 | 4.6 | 2.6 |
| 6a | 0.5 | 0.5 | Mg | 1,410 | (¹) | 61.2 | 28.5 |
| 6b | | | Mg | 1,300 | 73 | 42.3 | 20.7 |
| 7a | 0.5 | 0.5 | Ca | 1,430 | (¹) | 61.6 | 32.5 |
| 7b | | | Ca | 1,380 | (¹) | 50.5 | 13.8 |
| 8a | 0.5 | 0.5 | Sr | 1,410 | (¹) | 61.6 | 23.6 |
| 8b | | | Sr | | | 25.0 | 18.5 |
| 9a | 0.5 | 0.5 | Ba | 1,230 | 85 | 58.0 | 16.1 |
| 9b | | | Ba | 1,340 | 79 | 56.0 | 10.3 |
| Commercial Polyoxymethylene: | | | | | | | |
| Delrin 500 X | | | | 1,250 | 56 | 17.7 | 7.4 |
| Delrin 100 X | | | | 1,410 | 83 | 39.9 | 9.2 |

¹ No break.

No references cited.

WILLIAM H. SHORT, *Primary Examiner.*

L. M. PHYNES, *Assistant Examiner.*